US012601217B1

(12) United States Patent
Zhuang et al.

(10) Patent No.: US 12,601,217 B1
(45) **Date of Patent: *Apr. 14, 2026**

(54) SAFETY BOX

(71) Applicant: Shenzhen Lingyue Chuangxiang Technology Co., Ltd., Shenzhen (CN)

(72) Inventors: Qingfeng Zhuang, Quanzhou (CN); Jianqing Dai, Shenzhen (CN)

(73) Assignee: Shenzhen Lingyue Chuangxiang Technology Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/322,660

(22) Filed: Sep. 8, 2025

Related U.S. Application Data

(63) Continuation of application No. 19/066,210, filed on Feb. 28, 2025, now Pat. No. 12,435,559, and a continuation of application No. 19/066,215, filed on Feb. 28, 2025, now Pat. No. 12,435,560.

(30) Foreign Application Priority Data

Jan. 25, 2025 (CN) ......................... 202520172792.4
Jan. 25, 2025 (CN) ......................... 202520174444.0

(51) Int. Cl.
*E05G 1/00* (2006.01)
*E05G 1/04* (2006.01)

(52) U.S. Cl.
CPC ............... *E05G 1/005* (2013.01); *E05G 1/04* (2013.01)

(58) Field of Classification Search
CPC ........... E05G 1/005; E05G 1/026; E05G 1/04; E05B 49/00; E05B 2047/0056; E05B 65/0075
See application file for complete search history.

(56) References Cited

U.S. PATENT DOCUMENTS 5,153,561 A * 10/1992 Johnson ............... G08B 13/149 70/278.1
5,329,865 A * 7/1994 McWard ................... E05G 1/04 109/50
5,701,770 A * 12/1997 Cook ....................... E05B 47/02 382/124
6,318,134 B1 * 11/2001 Mossberg ........... E05B 65/5292 292/144
6,883,440 B1 * 4/2005 Correia ..................... E05G 1/04 70/1.5
9,216,697 B1 * 12/2015 Hayes ..................... E05G 1/026
(Continued)

*Primary Examiner* — Christopher J Boswell

(57) ABSTRACT

A safety box includes: a locking device; a palm vein unlocking module; and an awakening module. The locking device has a closed state and an unlocked state. The palm vein unlocking module is mounted on a housing or a cover and is configured to acquire palm vein information and drive the locking device to switch to the unlocked state. The awakening module is connected to the palm vein unlocking module and configured to detect whether an object approaches the palm vein unlocking module. When the awakening module does not detect any object approaching the palm vein unlocking module, at least a part of the palm vein unlocking module is in an unactuated state. When the awakening module detects that the object is approaching the palm vein unlocking module, the awakening module awakens the entire palm vein unlocking module to cause the palm vein unlocking module to start operating.

20 Claims, 13 Drawing Sheets

(56) References Cited

U.S. PATENT DOCUMENTS

| | | | | |
|---|---|---|---|---|
| 9,530,266 | B2 * | 12/2016 | Delattre | E05G 1/04 |
| 10,253,529 | B1 * | 4/2019 | McGinn | E05B 51/00 |
| 11,078,687 | B2 * | 8/2021 | Mack | E05G 1/005 |
| 11,486,164 | B2 * | 11/2022 | Zhang | E05G 1/005 |
| 11,734,974 | B2 * | 8/2023 | So | E05B 47/0012<br>340/5.82 |
| 12,435,559 | B1 * | 10/2025 | Zhuang | E05G 1/04 |
| 12,435,560 | B1 * | 10/2025 | Zhuang | E05G 1/04 |

* cited by examiner

SAFETY BOX

CROSS-REFERENCE TO RELATED APPLICATIONS

The present application is a continuation application of: the U.S. patent Ser. No. 19/066,215, filed on Feb. 28, 2025, and the U.S. patent Ser. No. 19/066,210, filed on Feb. 28, 2025. Both the U.S. patent Ser. No. 19/066,215 and the U.S. patent Ser. No. 19/066,210 claim the priority of: the Chinese patent application No. 202520172792.4, filed on Jan. 25, 2025; and the Chinese patent application No. 202520174444.0, filed on Jan. 25, 2025; and contents of which are incorporated herein by their entireties.

FIELD

The present disclosure relates to the field of safety devices, and particularly, to a safety box.

BACKGROUND

In an initial use of a safety box, it is necessary to press a setting key to input personal information for subsequent regular unlocking. However, in existing safety boxes, the setting key is typically located in the safety box, requiring users to open a cover and reach inside to operate the setting key, which is highly inconvenient.

SUMMARY

The present disclosure provides a safety box, including: a housing, defining an accommodating cavity for holding items and an opening communicated with the accommodating cavity; a cover, mounted on the housing and configured to open or close the opening; a locking device; a palm vein unlocking module; and an awakening module. The locking device has a closed state and an unlocked state. When the locking device is in the closed state, a relative position between the cover and the housing is locked, and the opening is closed. When the locking device is in the unlocked state, a lock between the cover and the housing is released, and the opening is allowed to be opened. The palm vein unlocking module is mounted on the housing or the cover, and configured to acquire palm vein information and drive the locking device to switch to the unlocked state. The awakening module is connected to the palm vein unlocking module and configured to detect whether an object approaches the palm vein unlocking module. When the awakening module does not detect any object approaching the palm vein unlocking module, at least a part of the palm vein unlocking module is in an unactuated state. When the awakening module detects that the object is approaching the palm vein unlocking module, the awakening module awakens the entire palm vein unlocking module to cause the palm vein unlocking module to start operating.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

REFERENCE NUMERALS IN THE DRAWINGS

Figure 1:
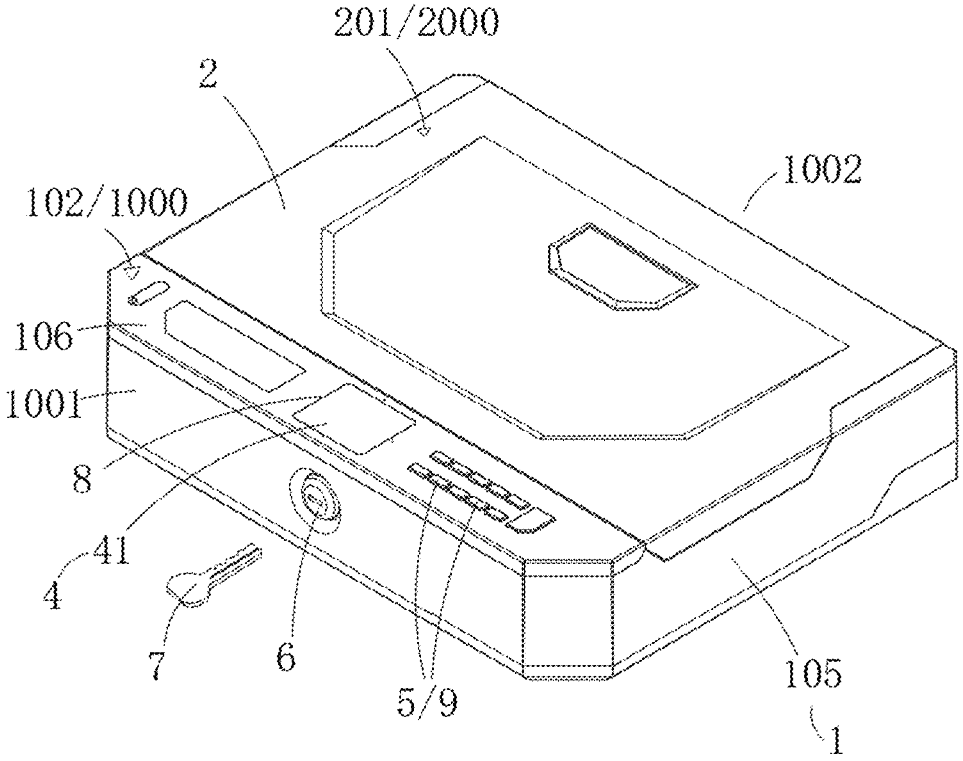
FIG. 1 is a schematic view of an overall external structure of a safety box according to an embodiment of the present disclosure.
Figure 2:
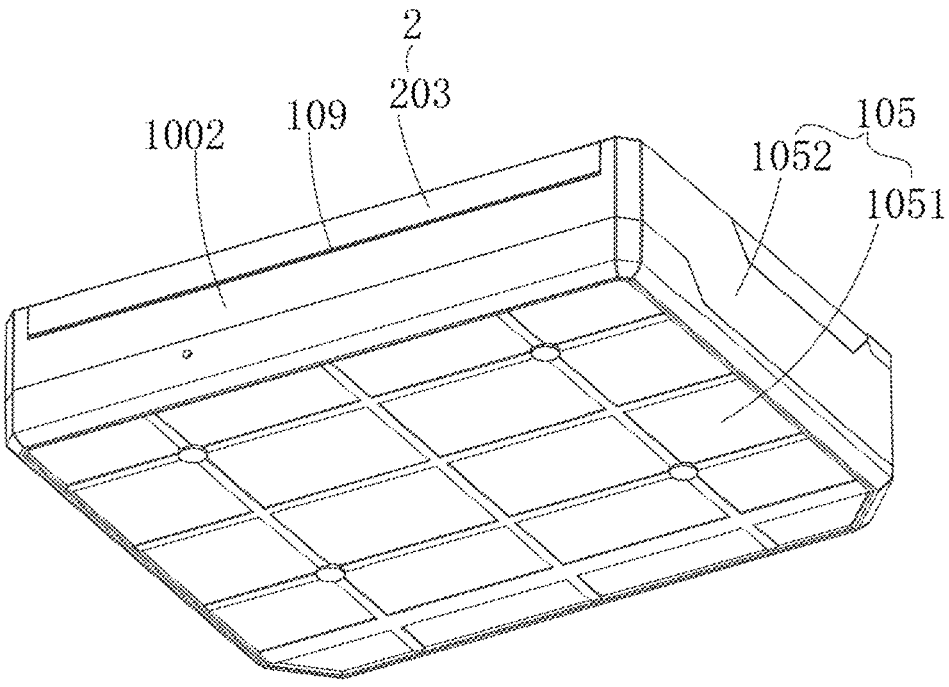
FIG. 2 is another schematic view of the overall external structure of the safety box according to an embodiment of the present disclosure.
Figure 3:
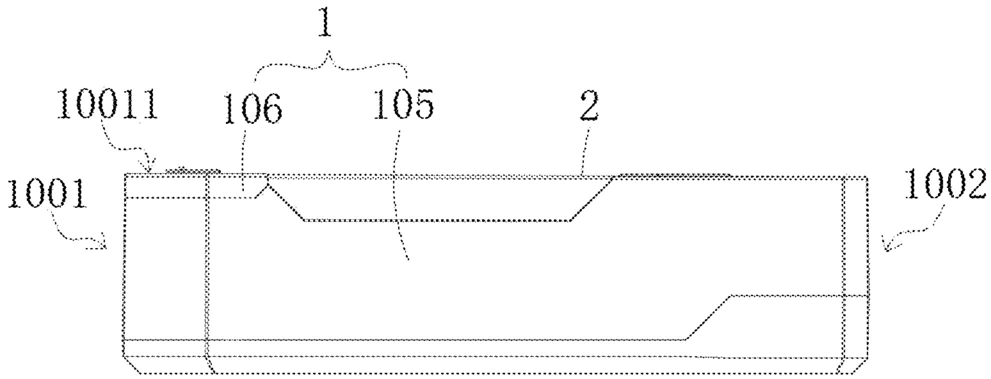
FIG. 3 is a further schematic view of the overall external structure of the safety box according to an embodiment of the present disclosure.

- Housing 1, accommodating cavity 100, opening 101, outer face 102 of the housing, first limiting boss 103, second limiting boss 104, rigid housing body 105, rigid panel 106, partition 107, mounting cavity 108, notch 109, bottom plate 1051, side wall 1052, fastening member 1053, fixing boss 1054, snaping hook 1055, snaping slot 1056, bottom face 1061 of the rigid panel, top face 1000 of the housing, front end 1001, rear end 1002, top face 10011 of the front end, top face 10021 of the rear end;
- Cover 2, outer face 201 of the cover, top plate 202, baffle 203, connecting portion 204, top face 2000 of the cover;
- Locking device 3, shell 31, electric driving structure 32, linkage structure 33, locking structure 34, locking hook 35, trigger portion 36, inclined slider 37, locking slot 311, top rod 331, spring 332, gear set 333, transmission teeth 341;
- Electronic unlocking module 4, palm vein unlocking module 41, password locking module 42, identification panel 411, palm vein processing element 412, key input panel 421, password processing element 422;
- Setting key 5;
- Mechanical unlocking module 6, lock core 61, toggle rod 62, swinging member 63, swinging boss 631;
- Unlocking key 7, awakening module 8, function key 9, timing unit 10, display module 11, power supply 12, control board 13, rotating shaft 14, torsion spring 15, main switch 16.

DETAILED DESCRIPTION

Unless otherwise defined, all technical and scientific terms used herein have the same meaning as commonly understood by those skilled in the art to which the present disclosure belongs. The terms used in the description of the present disclosure herein are intended for describing particular embodiments only and are not intended to limit the present disclosure. In the description, claims, and the above drawings of the present disclosure, the terms "including" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in conjunction with an embodiment may be included in at least one embodiment of the present disclosure. The appearance of the phrase at various places in the specification does not necessarily refer to the same embodiment, nor is it a separate or an alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

Referring to FIGS. 1-13, a safety box is provided in the present disclosure. The safety box is configured to provide secure, portable, and rapidly accessible storage for articles such as firearms. The safety box includes a housing 1, a cover 2, a locking device 3, an electronic unlocking module 4, and a setting key 5. The safety box may be placed at any desired location. In some embodiments, the safety box may be placed on a table, on a floor, in a wardrobe, built in any furniture, attached to a side wall of any furniture or a wall of a room, and so on. A size of the safety box may be determined based on a location where the safety box is placed. In some embodiments, a ratio of a length of the housing 1 to a height of the housing 1 ranges from 2:1 to 6:1.

The housing 1 defines an accommodating cavity 100 for holding items and an opening 101 communicated with the accommodating cavity 100. The cover 2 is mounted on the housing 1 and is capable of opening or closing the opening 101.

Figure 4:
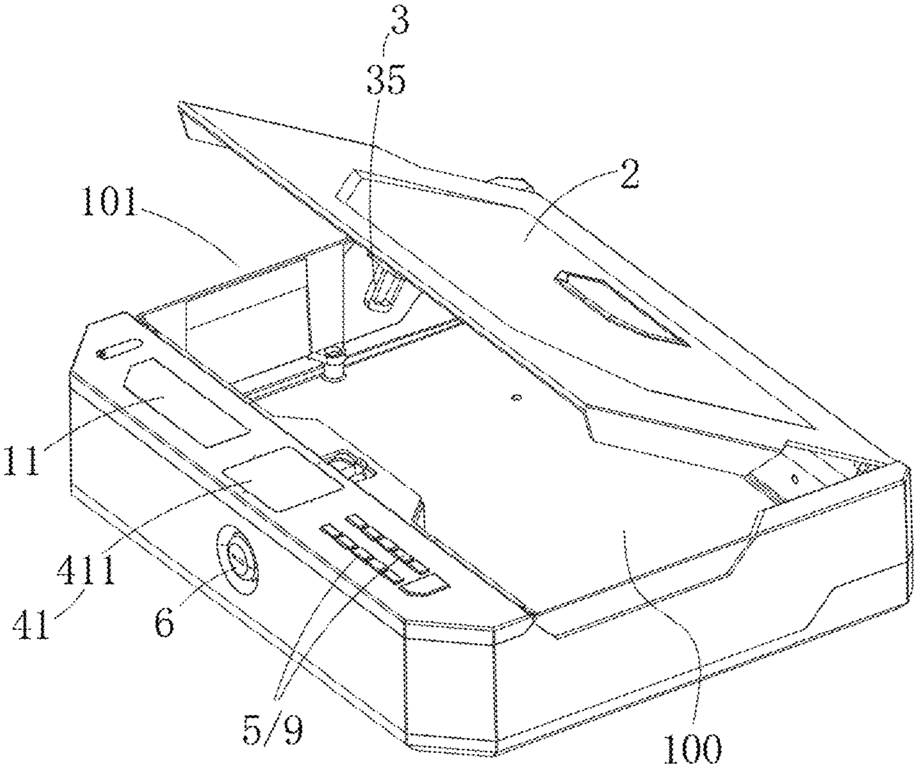
FIG. 4 is a structural view of the safety box according to an embodiment of the present disclosure, with a locking device in an open state and a cover opened.

The locking device 3 has a closed state and an unlocked state. When the locking device 3 is in the closed state, a relative position between the cover 2 and the housing 1 is locked, and the opening 101 is closed, as shown in FIG. 1. When the locking device 3 is in the unlocked state, a lock between the cover 2 and the housing 1 is released, and the opening 101 is allowed to be opened, as shown in FIG. 4.

The electronic unlocking module 4 is mounted on the housing 1 or the cover 2. In some embodiments, the electronic unlocking module 4 is mounted on a top face 1000 of the housing 1 or a top face 2000 of the cover 2. The electronic unlocking module 4 is electrically connected to the locking device 3. The electronic unlocking module 4 has a setting state and an identification state. When in the setting state, the electronic unlocking module 4 is configured to input an unlocking parameter for the locking device 3. When in the identification state, the electronic unlocking module 4 is configured to obtain unlocking information to control a state of the locking device 3.

Therefore, the electronic unlocking module 4 stores the unlocking parameter which is correct in advance. The obtained unlocking information is compared with the stored unlocking parameter, and when the obtained unlocking information matches the stored unlocking parameter, an unlocking signal is sent, causing the locking device 3 to switch to the unlocked state, thus allowing the cover 2 to be opened. Since the setting key 5 is located on the outer face 102 of the housing 1, it is more convenient to operate. An activation condition for the setting key 5 is that the locking device 3 is in the unlocked state, ensuring security of use.

When the safety box is first used, since the electronic unlocking module 4 does not yet store a correct unlocking parameter, the user needs to input the unlocking information. In the present embodiment, the setting key 5 is electrically connected to the electronic unlocking module 4, and the setting key 5 is located on the outer face 102 of the housing 1 or an outer face 201 of the cover 2. The embodiment shown in the drawings illustrates the setting key 5 being located on the outer face 102 of the housing 1. During an input process, the locking device 3 is set to the unlocked state, and activating the setting key 5 may cause the electronic unlocking module 4 to enter the setting state, during which parameters in the electronic unlocking module 4 can be adjusted.

Figure 11:
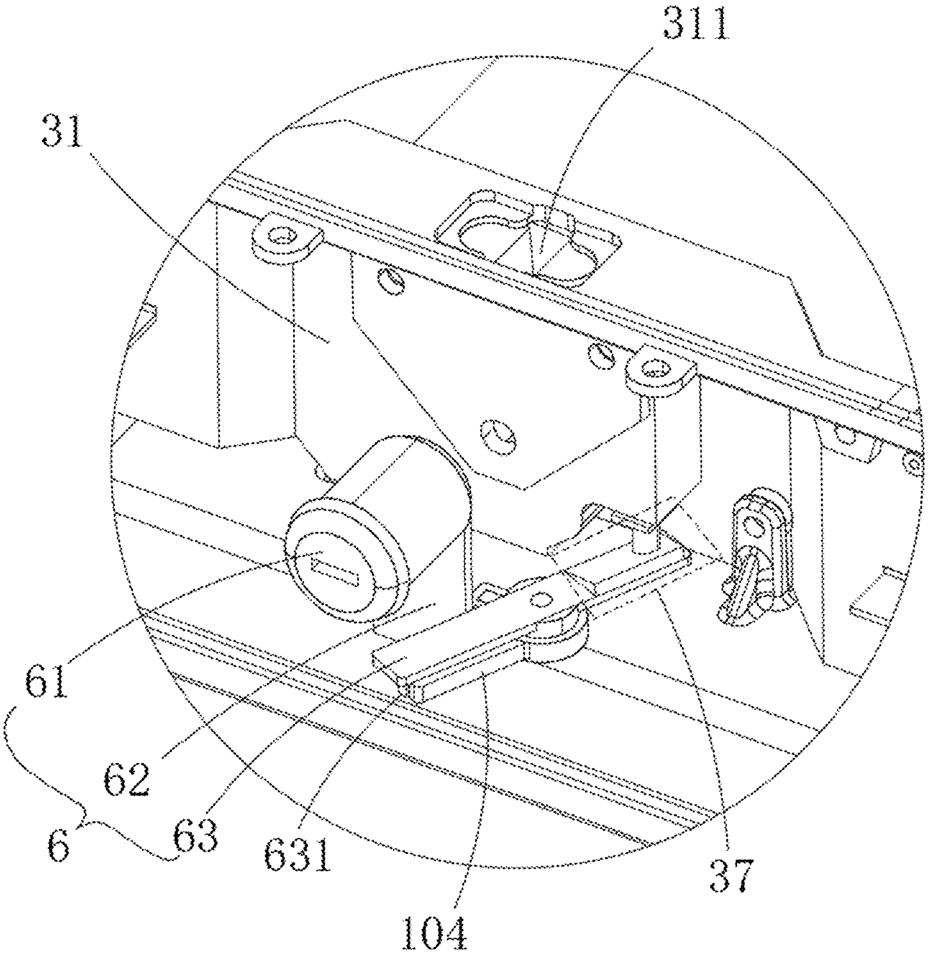
FIG. 11 is a schematic view of a connection structure between a mechanical unlocking module and the locking device according to an embodiment of the present disclosure.

Referring to FIGS. 1 and 11, during initial use, the electronic unlocking module 4 cannot open the cover 2. In the present embodiment, the safety box further includes a mechanical unlocking module 6 and an unlocking key 7. The mechanical unlocking module 6 is mounted on the housing 1 and is connected to the locking device 3 in a driving manner. The unlocking key 7 is matched with the mechanical unlocking module 6, and is configured to change the state of the locking device 3 via the mechanical unlocking module 6. Therefore, during the initial use, the user can use the unlocking key 7 to unlock the mechanical unlocking module 6, enabling the locking device 3 to switch to the unlocked state.

Regarding a specific structure of the mechanical unlocking module 6, as illustrated in FIGS. 6-8 and 10-11, in some embodiments, the mechanical unlocking module 6 includes a lock core 61, a toggle rod 62, and a swinging member 63. The lock core 61 is mounted on the housing 1. The toggle rod 62 is mounted on the lock core 61 and can rotate with the unlocking key 7. The swinging member 63 is rotatably mounted in the housing 1 and can be driven by the toggle rod 62. The locking device 3 includes a shell 31, an electric driving structure 32, a linkage structure 33, a locking structure 34, and a locking hook 35. The shell 31 is mounted in the housing 1. Each of the electric driving structure 32, linkage structure 33, and locking structure 34 is mounted in the shell 31. The locking hook 35 is mounted on the cover 2. When the cover 2 closes the opening 101, the locking hook 35 is locked in the locking structure 34. Each of the electric driving structure 32 and the linkage structure 33 is connected to the locking structure 34 in the driving manner, to drive the locking structure 34 to lock or unlock the locking hook 35. Therefore, each of the electric driving structure 32 and the linkage structure 33 can independently drive the locking structure 34.

Figure 12:
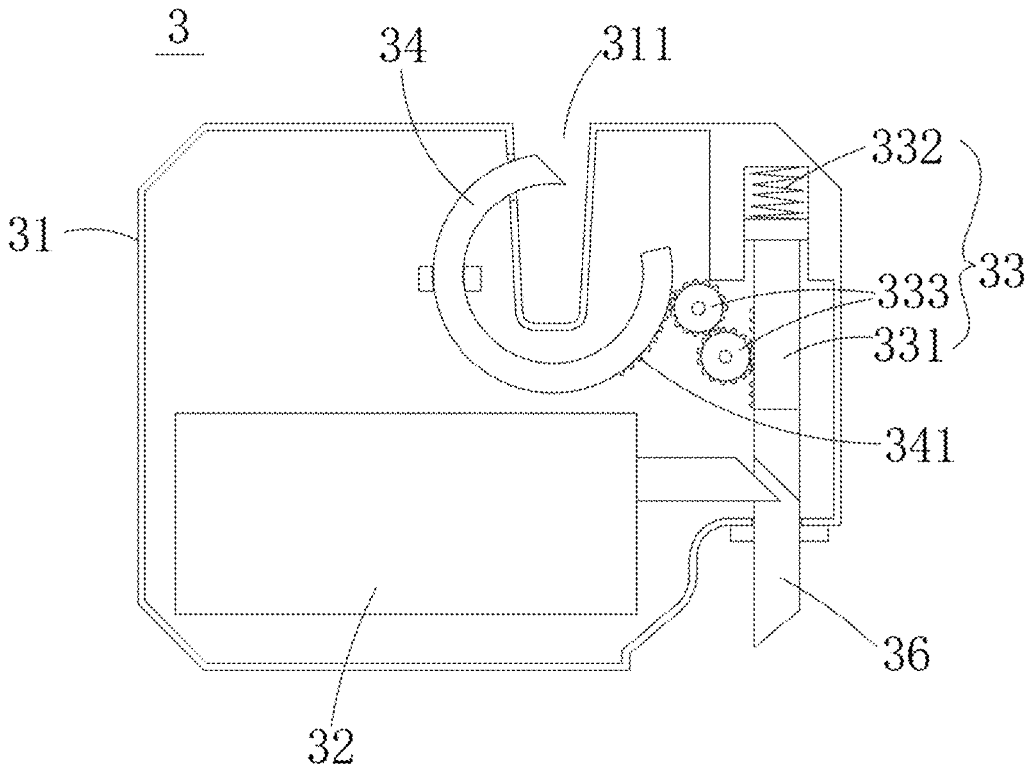
FIG. 12 is a schematic view of an internal structure of the locking device according to an embodiment of the present disclosure.

The locking structure 34 may adopt a conventional locking structure of a smart door or a structure as shown in FIG. 12, which is described as follows.

The shell 31 defines a locking slot 311. The locking structure 34 is in a shape of a ring. One end of the locking structure 34 can extend into the locking slot 311. The locking structure 34 is further arranged with a plurality of driving teeth 341. The linkage structure 33 includes a top rod 331, a spring 332, and a gear set 333. The gear set 333 engages with the plurality of driving teeth 341 of the locking structure 34. The top rod 331 can move vertically and is connected to the gear set 333 in the driving manner. The spring 332 is arranged on the top rod 331 and abuts against the top rod 331 and an inner wall of the shell 31. When moving vertically upward, the top rod 331 drives the gear set 333 to rotate, which in turn drives the locking structure 34 to rotate and move away from the locking hook 35, thereby releasing a lock on the locking hook 35. The spring 332 then causes the top rod 331 to move downward and return to an original position, meaning that the locking structure 34 moves in reverse and returns to an initial position. The locking structure 34 may have a bevel face at an end capable of extending into the locking slot 311. While being pushed down, the locking hook 35 abuts against the bevel face and drives the locking structure 34 to rotate until the locking hook 35 passes over the end of the locking structure 34. The locking structure 34 then returns to the initial position and locks the locking hook 35 under a force of the spring 332. The electric driving structure 32 can be a pushrod motor, with an output end of the pushrod motor abutting against the top rod 331. When the electronic unlocking module 4 sends an unlocking signal, the pushrod motor pushes the top rod 331 upward, thus driving the locking structure 34 to release the locking hook 35. In addition, a lower end of the top rod 331 extends beyond the shell 31 and forms a trigger portion 36. The swinging member 63 can rotate to abut against the trigger portion 36, thus achieving a coupling between the mechanical unlocking module 6 and the locking device 3. When the unlocking key 7 is inserted into the lock core 61 and rotated, the toggle rod 62 rotates and drives the swinging member 63 to swing until the swinging member 63 abuts against the trigger portion 36, thereby pushing the top rod 331 upward and unlocking the locking hook 35. Each of the swinging member 63 and the trigger portion 36 can be arranged with a bevel face, and when the swinging member 63 and the trigger portion 36 make contact at the two bevel faces, a sloped slider 37 is formed. The sloped slider 37 converts a horizontal swinging motion of the swinging member 63 into a vertical sliding motion of the top rod 331.

Furthermore, the housing 1 is further arranged with a first limiting boss 103 and a second limiting boss 104. The swinging member 63 is arranged with a swinging boss 631. The swinging boss 631 is movably arranged between the first limiting boss 103 and the second limiting boss 104 and can abut against the first limiting boss 103 or the second limiting boss 104. When the swinging boss 631 abuts against the first limiting boss 103, the swinging member 63 moves away from the trigger portion 36. When the swinging boss 631 abuts against the second limiting boss 104, the swinging member 63 contacts the trigger portion 36 and lifts the top rod 331. The first limiting boss 103 and second limiting boss 104 are configured to limit a swinging angle of the swinging member 63.

Further referring to FIG. 1, the electronic unlocking module 4 at least includes a palm vein unlocking module 41. The palm vein unlocking module 41 is mounted on the top face 1000 of the housing 1 and is configured to acquire user's palm vein information. The unlocking parameter at least includes a palm vein unlocking parameter, i.e., user's palm vein pattern information. When the user needs to open the cover 2, the user moves a palm to a sensing area of the palm vein unlocking module 41. The palm vein unlocking module 41 then acquires the palm vein information of the user and then compares the acquired palm vein information with a stored palm vein unlocking parameter. When the acquired palm vein information matches the stored palm vein unlocking parameter, the locking device 3 transitions to the unlocked state, allowing the cover 2 to be opened. Compared to fingerprint recognition, palm vein recognition has a larger and wider recognition area and does not require direct contact with user's palm, making unlocking operation more convenient, especially in emergency situations where rapid unlocking is required.

In some embodiments, to save power, the palm vein unlocking module 41 is configured to operate in a normally closed mode. In other words, under normal conditions, at least a part of the palm vein unlocking module 41 is in a power-off state to reduce energy consumption. The safety box further includes an awakening module 8. The awakening module 8 is mounted beside the palm vein unlocking module 41 and electrically connected to the palm vein unlocking module 41. The awakening module 8 is configured to awaken the palm vein unlocking module 41. Particularly, the awakening module 8 is an infrared sensor, designed to detect whether an object approaches the palm vein unlocking module 41. For example, when the user's palm approaches the palm vein unlocking module 41, the awakening module 8 senses the user's hand and fully awakens the palm vein unlocking module 41, causing the palm vein unlocking module 41 to begin operation. The infrared sensor can be arranged around the palm vein unlocking module 41, as shown in FIG. 1, or be designed in a concealed manner, with the infrared sensor covered in the sensing area of the palm vein unlocking module 41. In other embodiments, the awakening module 8 may also be a touch switch, key, or other component, requiring the user to manually touch the switch or press the key to awaken the palm vein unlocking module 41.

Additionally, the electronic unlocking module 4 may further include a password locking module 42. Accordingly, the safety box further includes a plurality of function keys 9. The plurality of function keys 9 are located on the outer face 102 of the housing 1 or the outer face 201 of the cover 2 and connected to the password locking module 42. The plurality of function keys 9 are used for password input. The unlocking parameter further include a password parameter, i.e., a correct password combination information. Therefore, the user may further unlock the password locking module 42 by entering a password, enabling the locking device 3 to transition to the unlocked state.

In some embodiments, the safety box includes a timing unit 10. The timing unit 10 is electrically connected to the password locking module 42 and the plurality of function keys 9. At least one of the plurality of function keys 9 serves as the setting key 5. The timing unit 10 is configured to detect a pressing duration of the at least one of the plurality of function keys 9 and, based on the pressing duration, enable the electronic unlocking module 4 to enter the setting state or the identification state. For example, when the pressing duration is detected to be within 1 second, the timing unit 10 determines a corresponding press is a short press. When the pressing duration exceeds 1 second, the timing unit 10 determines the corresponding press is a long press. When one of the plurality of function keys 9, which serves as the setting key 5, is short-pressed, the timing unit 10 may determines an electrical signal produced by the short press as an electrical signal generated by a function key 9 for entering the password into the password locking module 42, meaning that the electronic unlocking module 4 is in the recognition state. When the one of the plurality of function keys 9, which serves as the setting key 5, is long-pressed, the timing unit 10 may determines an electrical signal produced by the long press as an electrical signal generated by the setting key 5, which allows the electronic unlocking module 4 to enter the setting sate.

For example, when there are two setting keys 5, one of the two setting keys 5 is configured to set the palm vein unlocking module 41 to enter the setting state, and the other of the two setting keys 5 is used to set the password locking module 42 to enter the setting state. Correspondingly, two of the plurality of function keys 9 serve as the two setting keys 5.

In some embodiments, as shown in FIGS. 5-8, the housing 1 includes a rigid housing body 105, a rigid panel 106, and a partition 107. A material of each of the rigid housing body 105, partition 107, and cover 2 is a metal material, such as aluminum alloy. A material of the rigid panel 106 is a plastic material. The accommodating cavity 100 is defined in the rigid housing body 105, and the rigid housing body 105 also defines a mounting cavity 108. The mounting cavity 108 and the accommodating cavity 100 are separated from each other by the partition 107. The rigid panel 106 is fixedly mounted on the rigid housing body 105 and closes off the mounting cavity 108. At least a part of the electronic unlocking module 4 is mounted on the rigid panel 106. The safety box further includes a display module 11, a power supply 12, and a control board 13. The display module 11 is mounted on the rigid panel 106. Each of the power supply 12 and the control board 13 is mounted in the mounting cavity 108. The control board 13 is attached to a bottom face 1061 of the rigid panel 106 to optimize a spatial layout of the mounting cavity 108, providing more space to arrange the electronic unlocking module 4. Each of the electronic unlocking module 4, locking device 3, setting key 5, function keys 9, display module 11, and power supply 12 is electrically connected to the control board 13. Each of the display module 11, password locking module 42, and palm vein unlocking module 41 is electrically connected to the power supply 12. The display module 11 is at least configured to show power information of the power supply 12, alerting the user to recharge or replace the power supply 12.

The rigid housing body 105 includes a bottom plate 1051, side wall 1052, and a fastening member 1053. The bottom plate 1051, side wall 1052, and cover 2 cooperatively define the accommodating cavity 100. A side of the side wall 1052 facing the accommodating cavity 100 is arranged with a fixing boss 1054. The fastening member 1053 is located in the accommodating cavity 100 and is configured to fix the fixing boss 1054 and bottom plate 1051. The fastening member 1053 is arranged with a thread. The fastening member 1053 passes through the fixing boss 1054 and is in a threaded connection with the bottom plate 1051. In this way, fastening member 1053 is prevented from being exposed on the surface of the housing 1, thereby preventing unauthorized access to the bottom plate 1051 before unlocking the locking device 3, thus improving security.

Specifically, the bottom plate 1051 is further arranged with a snaping hook 1055, and the side wall 1052 defines a snaping slot 1056. The snaping hook 1055 is engaged in the snaping slot 1056. A connection between the bottom plate 1051 and side wall 1052 is achieved by both a snap engagement of the snaping hook 1055 and the snaping slot 1056 and fastening of the fastening member 1053. Furthermore, each of the side wall 1052, bottom plate 1051, and cover 2 is formed through metal die-casting.

Figure 13:
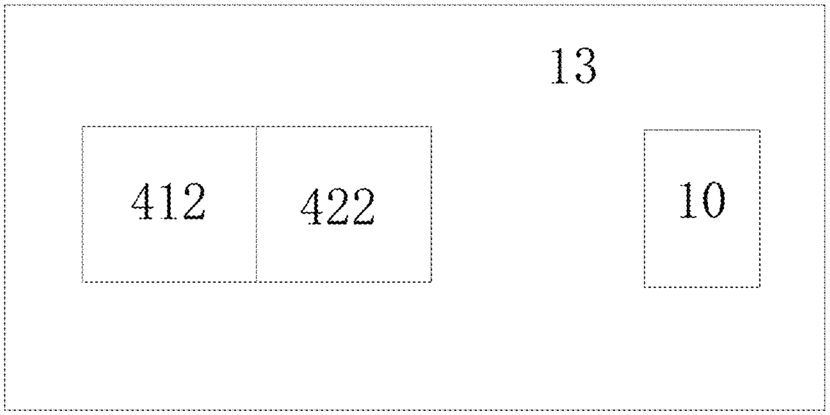
FIG. 13 is a simple distribution view of information processing components on a control board according to an embodiment of the present disclosure.

Specifically, as shown in FIGS. 4, 5, 9, and 13, the palm vein unlocking module 41 includes a recognition panel 411 and a palm vein processing element 412. The recognition panel 411 is mounted at a center of the rigid panel 106 and is configured to scan and acquire the palm vein information. The lock core 61 is located on the side wall 1052 of the rigid housing body 105. Each of the recognition panel 411 and lock core 61 is positioned at a front end 1001. The password locking module 42 includes a keypad panel 421 and a password processing element 422. The plurality of function keys 9 passes through the rigid panel 106 and connects to the keypad panel 421. The keypad panel 421 is mounted on a bottom surface of the rigid panel 106. One of the display module 11 and the function keys 9 is positioned on one side of the recognition panel 411, and the other of the display module 11 and the function keys 9 is positioned on the other side of the recognition panel 411. As shown in FIG. 13, the palm vein processing element 412, password processing element 422, timing unit 10, and other information-processing elements are integrated into the control board 13, where related information is centrally processed.

In some embodiments, to facilitate a rapid unlocking of the locking device 3 in an emergency, the housing 1 has a front end 1001 and a rear end 1002. Each of the palm vein unlocking module 41 and the plurality of function keys 9/the setting key 5 is mounted on a top face 10011 of the front end 1001. The opening 101 extends from the top face 10011 of the front end 1001 to a top face 10021 of the rear end 1002. The cover 2 is rotatably mounted at the rear end 1002. Specifically, the recognition panel 411 is horizontally mounted at a center of the top face 10011 of the front end 1001. In an emergency, when the user needs to unlock, his palm instinctively rests horizontally at a center of the front end 1001, while the recognition panel 411 is positioned at the center of the top face 10011 of the front end 1001, allowing the recognition panel 411 to immediately capture the user's palm vein information, thus eliminating a need for the user to search for the recognition panel 411.

Additionally, the safety box further includes a rotating shaft 14. The rotating shaft 14 is mounted in the accommodating cavity 100 and located at the rear end 1002. The cover 2 is rotatably mounted on the rotating shaft 14. The rear end 1002 of the housing 1 further defines a notch 109 communicated with the opening 101 and extending downward. The cover 2 includes a top plate 202, a baffle 203, and a connecting portion 204. The top plate 202 can rotate around the rotating shaft 14 to open or close the opening 101. The baffle 203 is perpendicular to the top plate 202 and is configured to open or close the notch 109. The connecting portion 204 is located at a connecting position of the top plate 202 and the baffle 203. The entire cover 2 is connected to the rotating shaft 14 through the connecting portion 204. Specifically, the rotating shaft 14 penetrates the connecting portion 204. A torsion spring 15 is mounted on the rotating shaft 14. The torsion spring 15 is connected between the cover 2 and the rigid housing body 105. When the locking device 3 is in the unlocked state, the torsion spring 15 is configured to enable the top plate 202 to automatically open the opening 101. The rotating shaft 14 is mounted in the mounting cavity 108 and is blocked by the top plate 202 and baffle 203, ensuring that the rotating shaft 14 remains entirely concealed, thereby enhancing safety.

Figure 5:
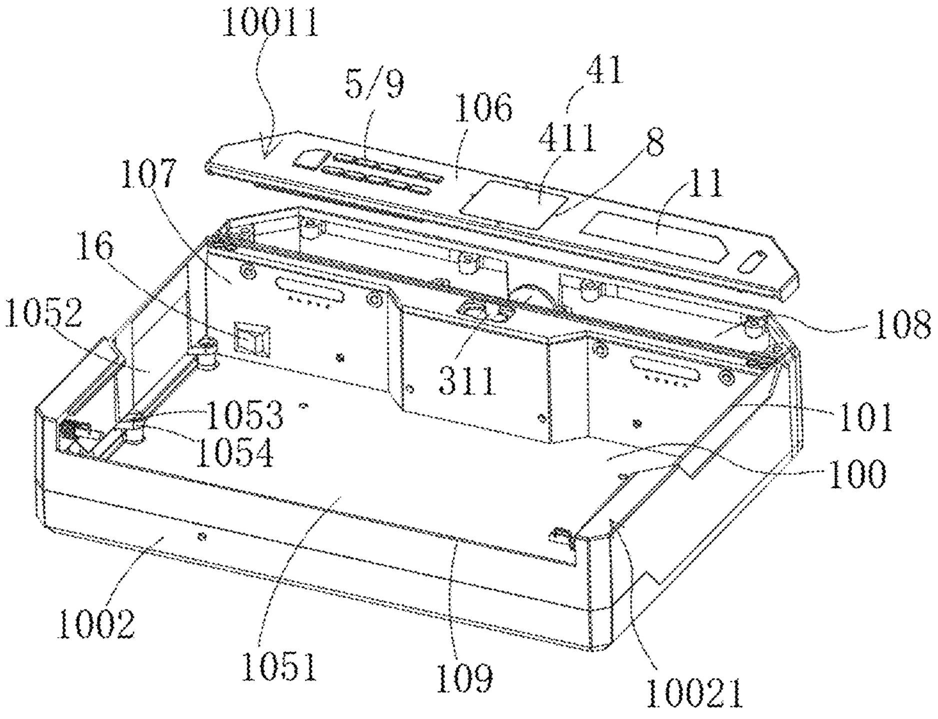
FIG. 5 is a structural view of a housing according to an embodiment of the present disclosure.
Figure 6:
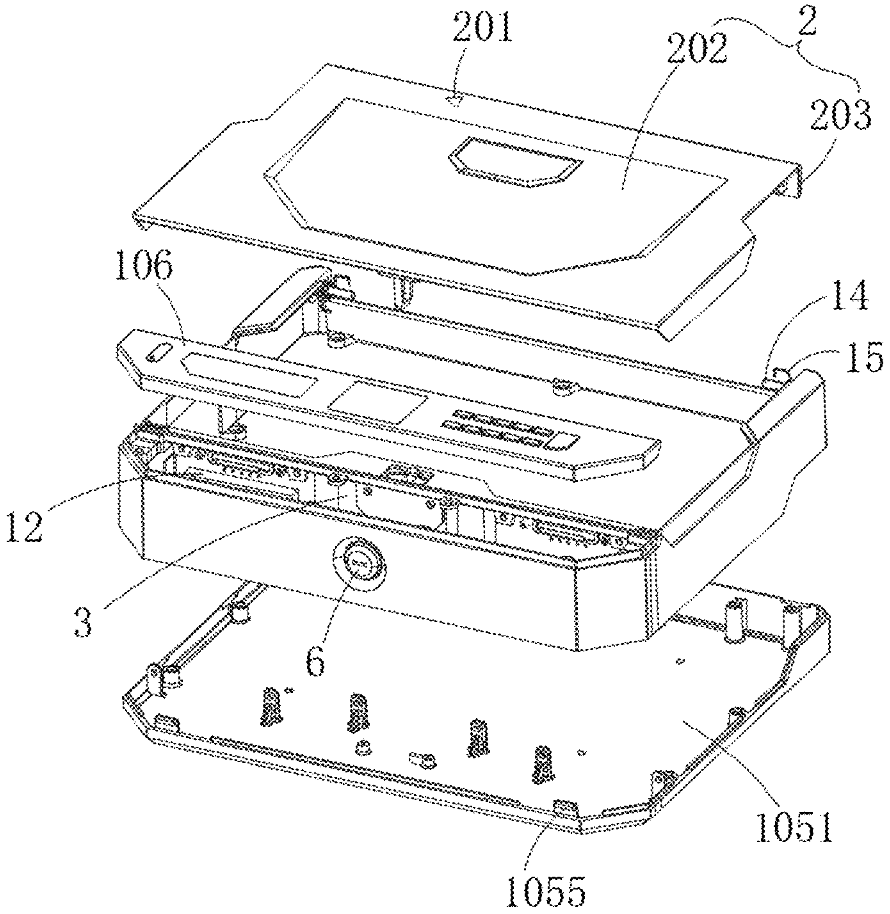
FIG. 6 is an exploded view of the safety box according to an embodiment of the present disclosure.
Figure 7:
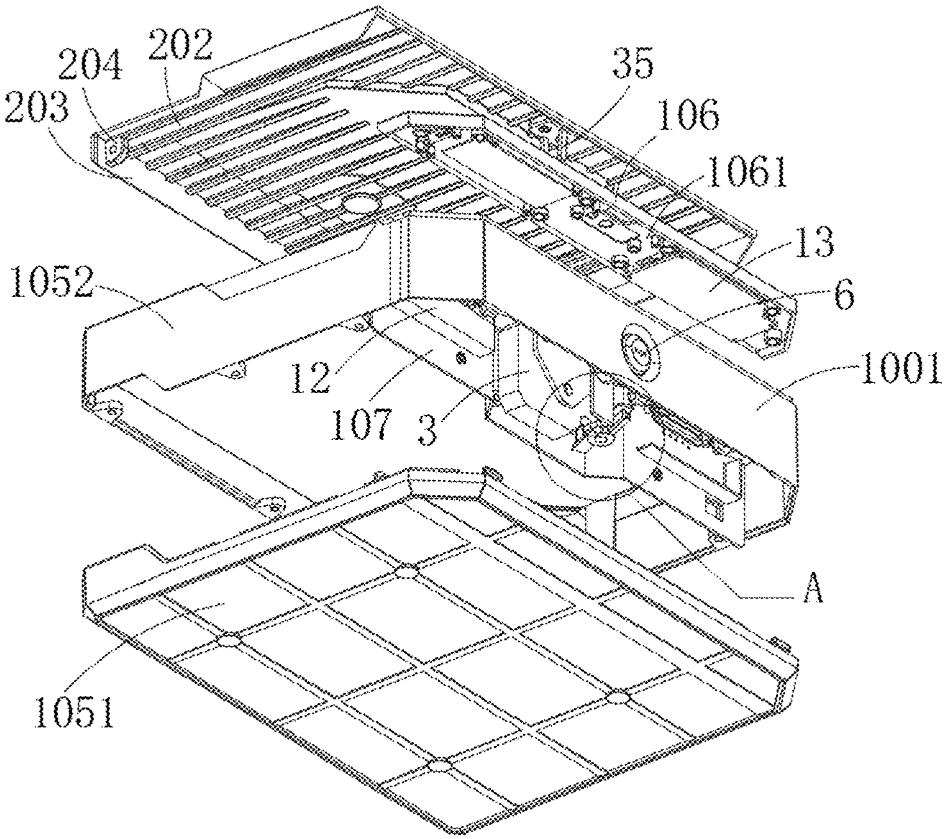
FIG. 7 is another exploded view of the safety box according to an embodiment of the present disclosure.
Figure 8:
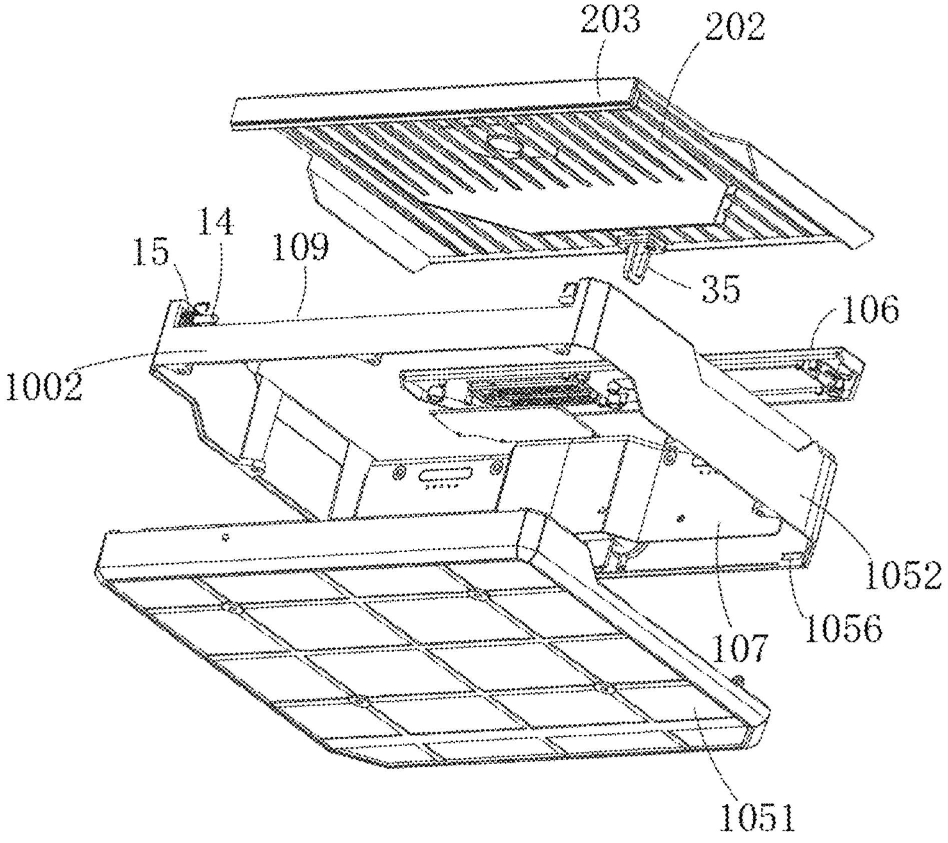
FIG. 8 is a further exploded view of the safety box according to an embodiment of the present disclosure.
Figure 9:
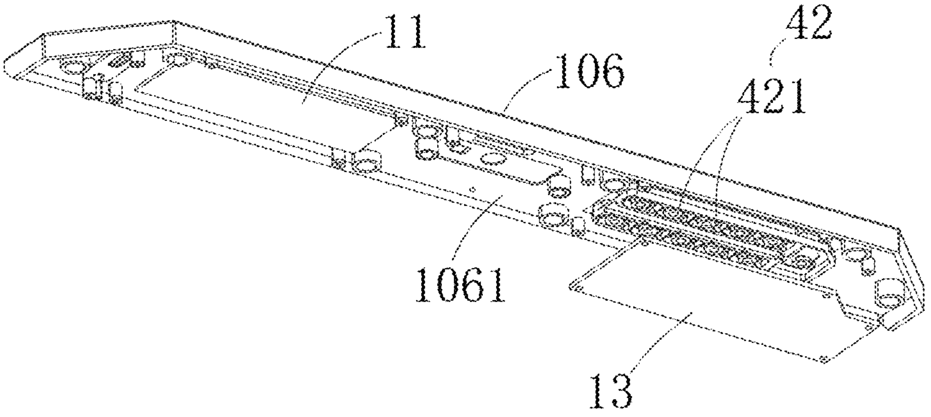
FIG. 9 is a structural view of a bottom face of a rigid panel according to an embodiment of the present disclosure.
Figure 10:
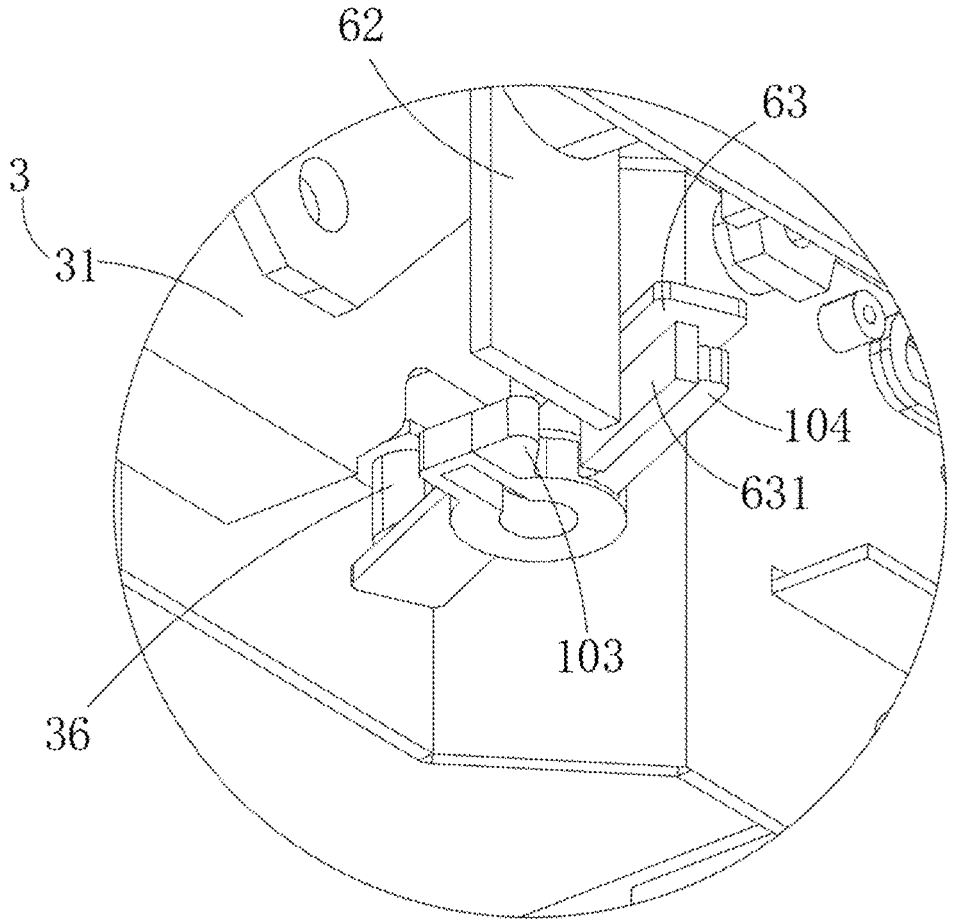
FIG. 10 is an enlarged view of a portion A in FIG. 7.

In some embodiments, as shown in FIG. 5, the safety box includes a main switch 16. The control board 13 is electrically connected to the power supply 12 via the main switch 16. The main switch 16 is mounted on the partition 107, with a part of the main switch 16 extending into the accommodating cavity 100. The main switch 16 is configured to power on or off the entire safety box and can only be operated after the cover 2 is opened.

Additionally, the control board 13 may include a wireless communication module to allow remote control by the user. Moreover, the control board 13 can be configured to trigger an automatic alarm when the number of incorrect unlocking attempts exceeds a preset limit.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A safety box, comprising:

a housing, defining an accommodating cavity for holding items and an opening communicated with the accommodating cavity;

a cover, mounted on the housing and configured to open or close the opening;

a locking device, having a closed state and an unlocked state, wherein when the locking device is in the closed state, a relative position between the cover and the housing is locked, and the opening is closed; when the locking device is in the unlocked state, a lock between the cover and the housing is released, and the opening is allowed to be opened; and a palm vein unlocking module, mounted on the housing or the cover, and configured to acquire palm vein information and drive the locking device to switch to the unlocked state; and an awakening module, connected to the palm vein unlocking module and configured to detect whether an object approaches the palm vein unlocking module; wherein, when the awakening module does not detect any object approaching the palm vein unlocking module, at least a part of the palm vein unlocking module is in an unactuated state; when the awakening module detects that the object is approaching the palm vein unlocking module, the awakening module awakens the entire palm vein unlocking module to cause the palm vein unlocking module to start operating.

2. The safety box as claimed in claim 1, wherein the palm vein unlocking module is horizontally mounted on a top face of the housing.

3. The safety box as claimed in claim 2, wherein the palm vein unlocking module comprises a recognition panel, and the recognition panel is horizontally arranged and is configured to acquire the palm vein information.

4. The safety box as claimed in claim 2, wherein the opening is defined in the top face of the housing.

5. The safety box as claimed in claim 4, wherein the housing has a front end and a rear end, the palm vein unlocking module is mounted on a top face of the front end, and the opening extends from the top face of the front end to a top face of the rear end.

6. The safety box as claimed in claim 5, wherein the palm vein unlocking module is mounted at a center of the top face of the front end.

7. The safety box as claimed in claim 1, wherein the awakening module is mounted beside the palm vein unlocking module.

8. The box as claimed in claim 7, wherein the awakening module is an infrared sensor.

9. The box as claimed in claim 8, wherein the infrared sensor is arranged around the palm vein unlocking module and/or is covered by a sensing area of the palm vein unlocking module.

10. The box as claimed in claim 9, wherein the sensing area is configured to sense, without contacting, a palm of a user to acquire the palm vein information.

11. The safety box as claimed in claim 7, wherein the awakening module is a touch switch or a key.

12. The safety box as claimed in claim 1, wherein the housing comprises a rigid housing body, a rigid panel, and a partition, the accommodating cavity is defined in the rigid housing body, the rigid housing body further defines a mounting cavity, the mounting cavity and the accommodating cavity are separated from each other by the partition, the rigid panel is fixedly mounted on the rigid housing body and closes off the mounting cavity, and the palm vein unlocking module is mounted on the rigid panel.

13. The safety box as claimed in claim 12, further comprising a power supply and a control board, wherein each of the power supply and the control board is mounted in the mounting cavity, and each of the palm vein unlocking module, locking device, and power supply is electrically connected to the control board.

14. The safety box as claimed in claim 12, wherein a material of each of the rigid housing body and cover is a metal material, and a material of the rigid panel is a plastic material.

15. The safety box as claimed in claim 1, wherein the cover is rotatably mounted on the housing.

16. The safety box as claimed in claim 15, wherein the housing has a front end and a rear end, the palm vein unlocking module is mounted on a top face of the front end, the opening extends from the top face of the front end to a top face of the rear end, and the cover is rotatably mounted at the rear end.

17. The safety box as claimed in claim 16, further comprising a rotating shaft, wherein the rotating shaft is mounted in the accommodating cavity, and the cover is rotatably mounted on the rotating shaft.

18. The safety box as claimed in claim 17, wherein the rear end of the housing further defines a notch communicated with the opening and extending downward;

the cover comprises a top plate, a baffle, and a connecting portion, the top plate is configured to open or close the opening, the baffle is perpendicular to the top plate and is configured to open or close the notch, the connecting portion is located at a connecting position of the top plate and the baffle, and the rotating shaft penetrates the connecting portion and is rotatably connected with the cover.

19. The safety box as claimed in claim 1, further comprising a display module and a power supply, wherein the display module is mounted on the housing, the power supply is mounted in the mounting cavity, and the display module is electrically connected with the power supply and the palm vein unlocking module.

20. The safety box as claimed in claim 19, wherein the display module is configured to operate in a normally on mode, and at least show power information of the power supply.

* * * * *